United States Patent
Iwamura

(10) Patent No.: US 7,792,106 B2
(45) Date of Patent: Sep. 7, 2010

(54) AUDIO/VIDEO NETWORK INTERFACE

(75) Inventor: Ryuichi Iwamura, San Diego, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 1099 days.

(21) Appl. No.: 10/879,445

(22) Filed: Jun. 29, 2004

(65) Prior Publication Data

US 2005/0286509 A1    Dec. 29, 2005

Related U.S. Application Data

(60) Provisional application No. 60/578,090, filed on Jun. 8, 2004.

(51) Int. Cl.
*H04L 12/28* (2006.01)
*H04L 12/56* (2006.01)

(52) U.S. Cl. ................ 370/390; 370/464; 370/361; 370/916

(58) Field of Classification Search ................ 370/390, 370/464, 351, 916; 340/538
See application file for complete search history.

(56) References Cited

U.S. PATENT DOCUMENTS

| | | | |
|---|---|---|---|
| 6,373,377 B1 | 4/2002 | Sacca et al. | |
| 6,684,065 B2* | 1/2004 | Bult et al. | 455/252.1 |
| 6,748,080 B2 | 6/2004 | Russ et al. | |
| 6,940,857 B2* | 9/2005 | Weinman, Jr. | 370/390 |
| 6,944,232 B2* | 9/2005 | Koga et al. | 375/260 |
| 6,995,657 B2* | 2/2006 | Zalitzky et al. | 370/445 |
| 7,020,784 B2* | 3/2006 | Raphaeli et al. | 370/242 |
| 7,193,506 B2* | 3/2007 | Logvinov et al. | 340/310.11 |
| 2002/0031226 A1* | 3/2002 | Simonsen et al. | 380/255 |
| 2002/0056116 A1 | 5/2002 | Smith | |
| 2003/0067910 A1 | 4/2003 | Razazian et al. | |
| 2003/0088706 A1 | 5/2003 | Chan et al. | |

(Continued)

OTHER PUBLICATIONS

"Self Correcting Codes Conquer Noise—Part One: Viterbi Codecs", Shah et al., ednmag.com, EDN, pp. 131-140, Feb. 15, 2001.

(Continued)

*Primary Examiner*—Pankaj Kumar
*Assistant Examiner*—Lonnie Sweet
(74) *Attorney, Agent, or Firm*—Miller Patent Services; Jerry A. Miller

(57) ABSTRACT

A method for multicasting audio data in a power line communication network consistent with certain embodiments involves assigning a set of one or more time slots and one or more sub-carriers for each recipient audio client designated to receive the multicast audio data over a power line serving as a communication medium. A list of recipient audio clients is built for receipt of the multicast audio data over the power line communication network. Audio data are buffered in a buffer, the data being for receipt during a transmission cycle to the recipient audio clients on the list. Data are read from the buffer, and the data are transmitted over the power line communication network to each recipient on the recipient audio client on the list using a time slot and sub-carrier set assigned to each recipient during the transmission cycle. This abstract should not be considered limiting, since other embodiments may incorporate more, fewer or different elements that those described in this abstract.

66 Claims, 9 Drawing Sheets

U.S. PATENT DOCUMENTS

| | | |
|---|---|---|
| 2003/0103521 A1* | 6/2003 | Raphaeli et al. ............. 370/445 |
| 2003/0133473 A1 | 7/2003 | Manis et al. |
| 2004/0066283 A1 | 4/2004 | Manis et al. |
| 2004/0081089 A1* | 4/2004 | Ayyagari et al. ............. 370/229 |
| 2004/0087214 A1 | 5/2004 | Cho |
| 2004/0158333 A1* | 8/2004 | Ha et al. ......................... 700/3 |
| 2004/0208158 A1* | 10/2004 | Fellman et al. ............. 370/345 |
| 2004/0218093 A1* | 11/2004 | Radha et al. ............. 348/384.1 |
| 2005/0169401 A1* | 8/2005 | Abraham et al. ............. 375/295 |
| 2006/0187909 A1* | 8/2006 | Sho et al. ..................... 370/389 |
| 2008/0140797 A1* | 6/2008 | Ha et al. ..................... 709/208 |

OTHER PUBLICATIONS

"A Comparative Performance Study of Wireless and Power Line Networks", Lin et al., IEEE Communications Magazine, pp. 54-63, Apr. 2003.

"Homeplug Standard Brings Networking to the Home", Gardner et al., CommsDesignJun. 8, 2004.

* cited by examiner

AUDIO/VIDEO NETWORK INTERFACE

CROSS REFERENCE TO RELATED DOCUMENTS

This application is related to U.S. Provisional Patent Application No. 60/578,090, filed Jun. 8, 2004, which is hereby incorporated herein by reference. This application is also related to the following U.S. patent applications which are hereby incorporated by reference herein: Ser. No. 60/488,518, filed Jul. 17, 2003; Ser. No. 10/723,079, filed Nov. 25, 2003; Ser. No. 60/520,591, filed Nov. 17, 2003; Ser. No. 10/779,400, filed Feb. 16, 2004; and Ser. No. 10/379,626, filed Mar. 4, 2003.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Power line Audio/Video networks will likely gain wide acceptance and be used extensively in homes in near future. Certain of these networks using the HomePlug standard were designed to target video streaming. Audio streaming occupies only less than 10% of the bandwidth that video streaming uses. Therefore, little consideration has been given to handling audio applications in such video-oriented networks. There are, however, several significant things to consider when using a Power Line Communication (PLC) network for audio applications.

One issue is cost. Recently, high quality audio products have become quite cost-competitive. Consumers have accordingly become unwilling to pay premiums to listen to music, since it is generally unnecessary to do so when high quality can be achieved at very low costs. A networked audio product is likely to be no exception. Unfortunately, new power line network interfaces that are currently under design for video transmission applications are redundant and may be considered too expensive for audio applications.

Another problem is that of receipt of the same music by multiple target devices. It will be useful for a power line network to provide background music (BGM) or other music programs to multiple targets. However, there is currently no mechanism contemplated that is suitable for broadcasting audio to multiple targets.

BRIEF DESCRIPTION OF THE DRAWINGS

Certain exemplary embodiments may be best understood by reference to the following detailed description taken in conjunction with the accompanying drawings in which.

DETAILED DESCRIPTION

Figure 1:
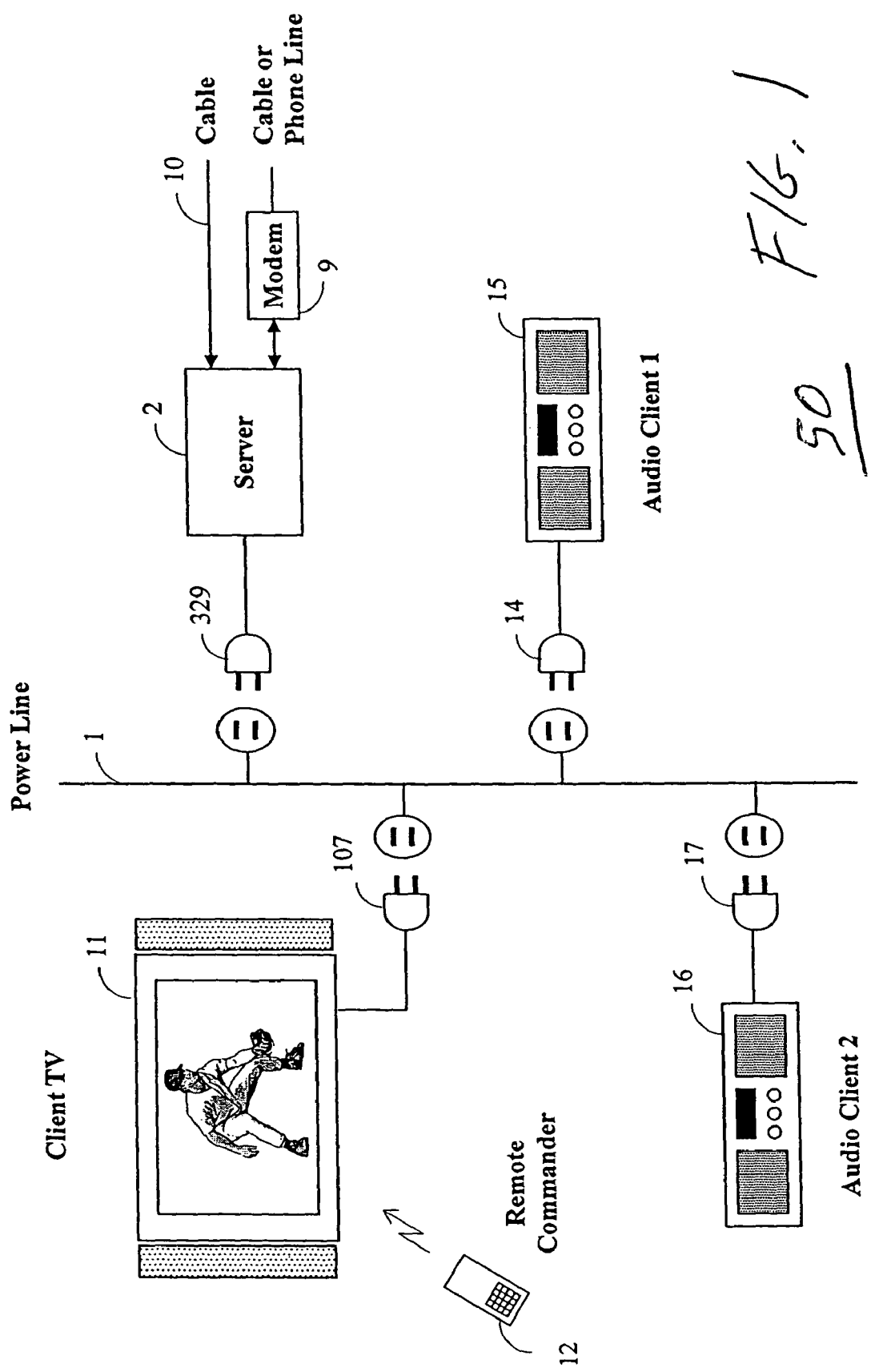
FIG. 1 is a block diagram of a power line network consistent with certain embodiments of the present invention.

There is shown in the drawings and will herein be described in detail specific embodiments, with the understanding that the present disclosure is to be considered as exemplary and is not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

For purposes of this document, the term "power line communication network" is intended to embrace any network that utilizes electrical power lines within a home, office or other structure as the communication medium used for network communication between connected devices. In particular, this term is used to encompass networks designed to use the HomePlug network standards, current and future, which utilize a time slotted form of Orthogonal Frequency Division Multiplexing (OFDM) as the multiplexing mechanism to provide communications over the power line medium within the 4 to 30 MHz frequency band. Also, for purposes of this document, the term "low bit rate modulation", and similar terms, should be interpreted to mean any modulation scheme such as BPSK, QPSK which encodes less than four (4) bits per symbol.

As previously noted, it will be useful for a power line network to provide background music (BGM) or other music programs to multiple targets. However, there is currently no mechanism contemplated that is suitable for broadcasting audio to multiple targets.

In accordance with certain embodiments consistent with the present invention, providing audio to multiple targets is accomplished by a server sending the same audio stream to plural clients using a multicasting mechanism. Power line communication networks usually use OFDM (Orthogonal Frequency Division Multiplexing). Systems using such OFDM multiplexing utilize multiple sub-carriers to carry data from a source to a destination. The available sub-carriers in a PLC system depends on the quality and characteristics of the transmission path, since power lines were not initially designed for data communication, and generally has unknown or unpredictable physical characteristics. Using the current standard, it is impossible for multiple targets (clients) to share one single stream of data since some clients may not be able to receive certain sub-carriers. Thus, intrinsically, broadcast is not available in power line network (except on a very low rate control channel which is not available for use for audio traffic).

In order to provide a broadcast-like mechanism for PLC networks to distribute audio data to multiple clients, a multicast mechanism can be used in which the sever separately sends the same stream of data to each client. Since each stream is a relatively low bit rate, the availability of bandwidth to send redundant data is not generally expected to be the problem that it might be for higher data rate information (e.g., video). However, a power line communication interface is needed which has the capability of repeatedly sending the same data to different destinations.

FIG. 1 shows an example of a power line communication network 50 and connected devices. Server 2 receives a signal from Cable 10 or Internet data from Modem 9, or any other suitable data source that can supply audio and/or video content. Modem 9 is, for example, a cable modem or an ADSL telephone line modem. Server 2 receives a remote command (ex. channel up/down) from another device, for example, Remote Commander 12. Server 2 sends and receives AV streams commands or data over the power line 1 through Power Plug 329. Audio clients 15 and 16 are, for example, a stereo system (e.g., a "boom box") with a power line network interface. They receive and decode an audio stream sent from Server 2 over the power line 1.

Figure 2:
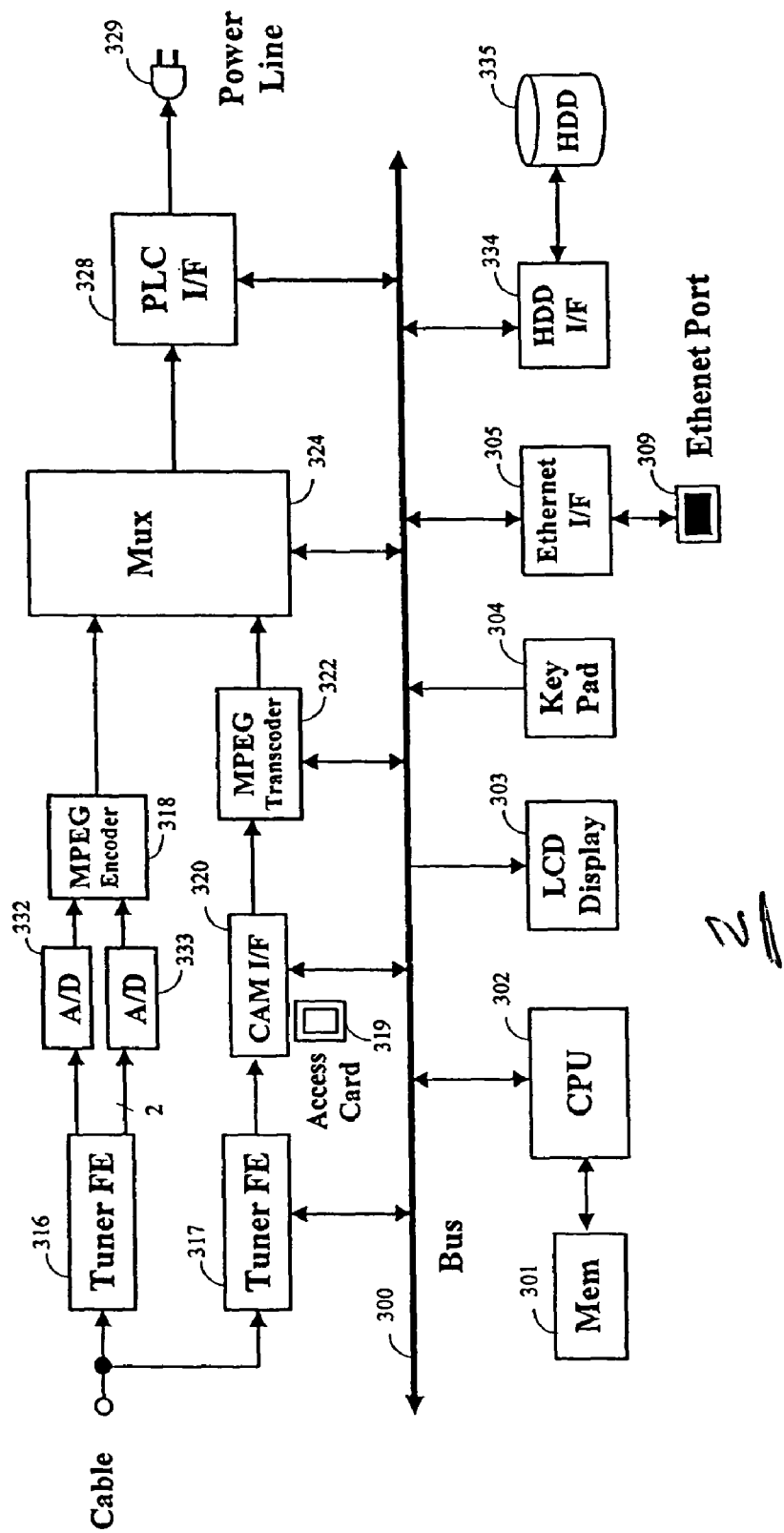
FIG. 2 is a block diagram of a server consistent with certain embodiments of the present invention.

FIG. 2 illustrates an exemplary block diagram of Server 2. An analog cable signal is tuned and demodulated in Tuner/Frontend 316. The video output from Tuner/Frontend 316 is analog-digital converted in analog to digital converter (A/D) 332 and MPEG encoded in MPEG Encoder 318. Similarly, the audio output from Tuner/Frontend 316 is analog-digital converted in A/D 333 and MPEG encoded in MPEG Encoder 318. The output stream from MPEG Encoder 318 is sent to Multiplexer 324. A digital cable signal is tuned and demodulated in Tuner/Frontend 317. The output signal, which is encrypted for content protection in this embodiment, is decrypted in CAM (Conditional Access Module) Interface 320. CAM Interface 320 decrypts the stream in cooperation with Access Card 319. The decrypted stream is transcoded at another rate in MPEG Transcoder 322 if necessary and sent to Multiplexer 324. Multiplexer 324 multiplexes the two input streams and the result is sent to PLC Interface 328. PLC Interface 328 sends the streams to the power line 1 through Power Plug 329.

If the user desires, the incoming streams may be recorded to hard disc drive (HDD) 335 through HDD Interface 334. Multiplexer 324 or MPEG Transcoder 322 sends the stream to HDD 335. For playback, the recorded stream is sent to PLC I/F 328 and transmitted to a client, for example, Client TV 11. HDD 335 may store audio data downloaded from the Internet or another device on the power line network 1.

CPU 302 controls operation of all the blocks through Internal Bus 300. CPU 302 runs the control software program stored in Memory 301. Keypad 304 (or other suitable user interface device) sends input data to CPU 302 through Bus 300 in order to control the operation according to the user's instructions. LCD Display 303 is used to display data sent from CPU 302 (ex. tuning status, network status, error messages, etc.). Cable/Phone Line Modem 9 is connected to Ethernet Port 309. Data from Modem 9 is sent to CPU 302 and processed.

Thus, a server, consistent with certain embodiments, provides multicast audio data in a power line communication (PLC) network has a power line communication interface that couples data to and from a power line network serving as a communication medium using a time slotted Orthogonal Frequency Division Multiplexing (OFDM) transmitter and receiver and a source of audio content. A set of one or more time slots and one or more sub-carriers is assigned for each recipient audio client designated to receive the multicast audio data over the a power line. A list of recipient audio clients for receipt of the multicast audio data over the power line communication network is built. A buffer memory buffers audio data from the source of audio content, the data being for receipt during a transmission cycle to the recipient audio clients on the list. The data are read from the buffer and the OFDM transmitter transmits the data over the power line communication network to each recipient on the recipient audio client on the list using a time slot and sub-carrier set assigned to each recipient during the transmission cycle.

Figure 3:
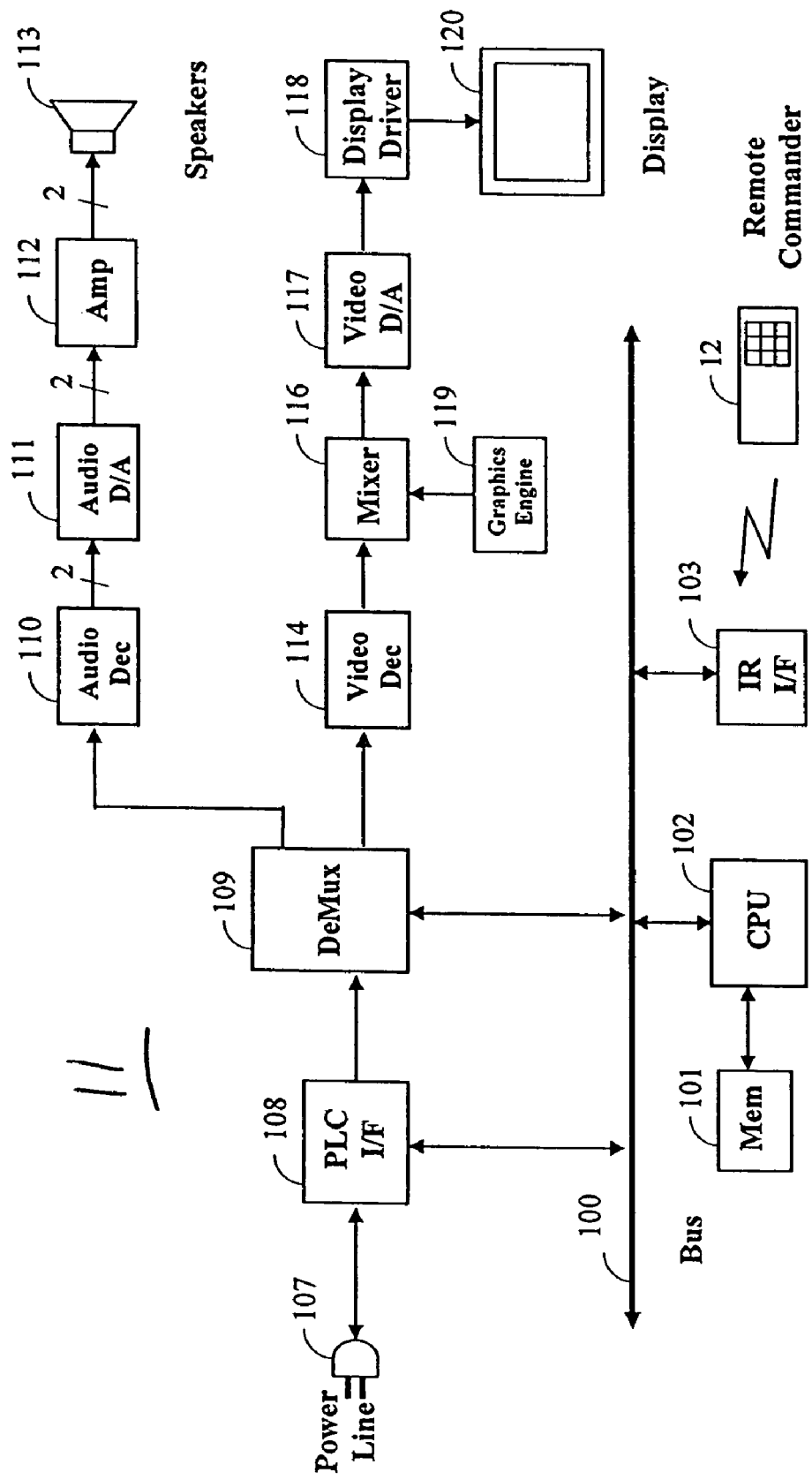
FIG. 3 is a block diagram of a client television device consistent with certain embodiments of the present invention.

FIG. 3 is a block diagram of an exemplary Client TV 11 of system 50. Client TV 11 receives an audio/video stream and exchanges commands and data over the power line 1 through Power Plug 107. Client TV 11 also receives certain user commands from Remote Commander 12 and forwards them to a destination, for example, Server 2. Server 2 may be conveniently situated for easy connection to the cable terminal while the client TV can be conveniently located in a convenient location elsewhere in the user's home, for example, a bedroom or living room.

PLC Interface 108 receives a signal sent over the power line 1 through Power Plug 107. The output signal from 108 is demultiplexed in Demultiplexer 109 such that control data are sent to CPU 102, audio data are sent to Audio Decoder 110 and video data are sent to Video Decoder 114. In Mixer 116, decoded video signals from Video Decoder 114 is mixed with graphics data generated in Graphics Engine 119 and digital-analog converted in Video D/A 117. The resulting signal is sent to Display Driver 118 for display on Display 120. It should be noted that the display 120, and possibly the display driver 118, may be embodied as a separate physical device in certain embodiments. Decoded audio signals from Audio Decoder 110 is digital-analog converted in Audio D/A 111, amplified in Amplifier 112 and sent to Speakers 113. It is also noted that amplifier 112 and speakers 113 could be embodied in separate physical devices or may be integrated within TV 11. Audio D/A 111, Amplifier 112 and Speaker 113, according to certain embodiments, may handle two audio channels (left and right). In other embodiments, additional channels (e.g., subwoofer, center, rear, surround, etc.) of audio data can be handled in similar systems.

CPU 102 exchanges asynchronous data (commands, data, etc.) with CPU 302 in Server 2 over the power line 1. CPU 102 controls all the blocks of television 11 through Internal Bus 100. CPU 102 operates by running a control software program stored in Memory 101, which may be for example, non-volatile storage such as EEPROM, or other memory such as battery backed up RAM memory, ROM memory, disc storage, or any combination of suitable memory devices without limitation. IR Interface 103 receives commands from Remote Commander 12 which are sent to CPU 102 through Bus 100.

Figure 4:
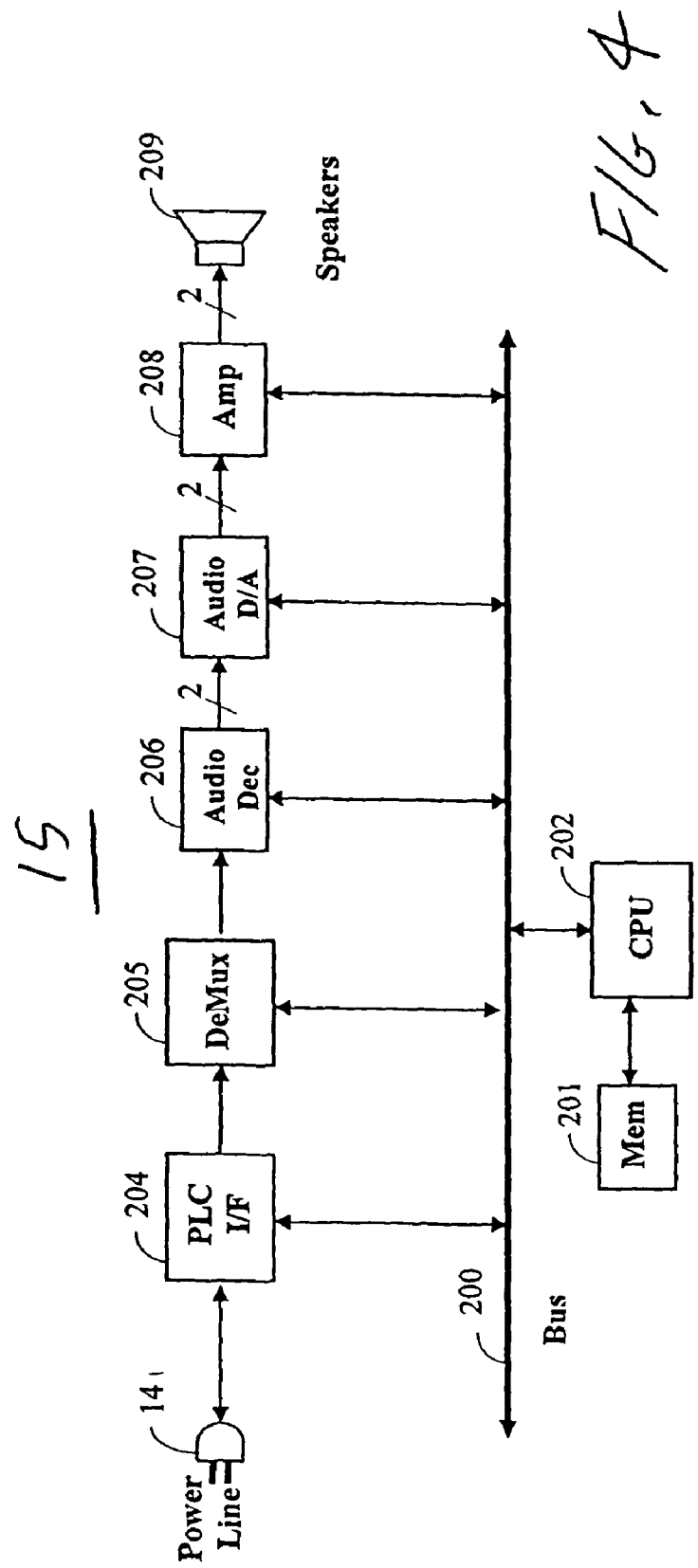
FIG. 4 is a block diagram of an audio client consistent with certain embodiments of the present invention.

FIG. 4 illustrates a block diagram of an exemplary Audio Client 15 (which operates in a manner similar to that of Audio Client 16) as depicted in system 50. In this exemplary audio client, PLC Interface 204 receives a signal sent over the power line 1 through Power Plug 14. Output signals from PLC Interface (I/F) 204 is demultiplexed at Demultiplexer 205 to extract the appropriate audio stream that is destined for device 15. This demultiplexed audio data are decoded in Audio Decoder 206. The decoded signal is digital-analog converted in Audio D/A 207, amplified in Amplifier 208 and sent to Loudspeakers 209. It is noted that in certain embodiments, the loudspeakers 209 may be embodied in separate housings than the remainder of Audio Client 15. CPU 202 controls all the functional blocks of device 15 by communications through Internal Bus 200. CPU 202 operates by running control software program stored in Memory 201, which may be for example, non-volatile storage such as EEPROM, or other memory such as battery backed up RAM memory, ROM memory, disc storage, or any combination of suitable memory devices without limitation. CPU 202 exchanges asynchronous data (commands, status, data, etc.) with CPU 302 in Server 2 through PLC I/F 204.

Figure 5:
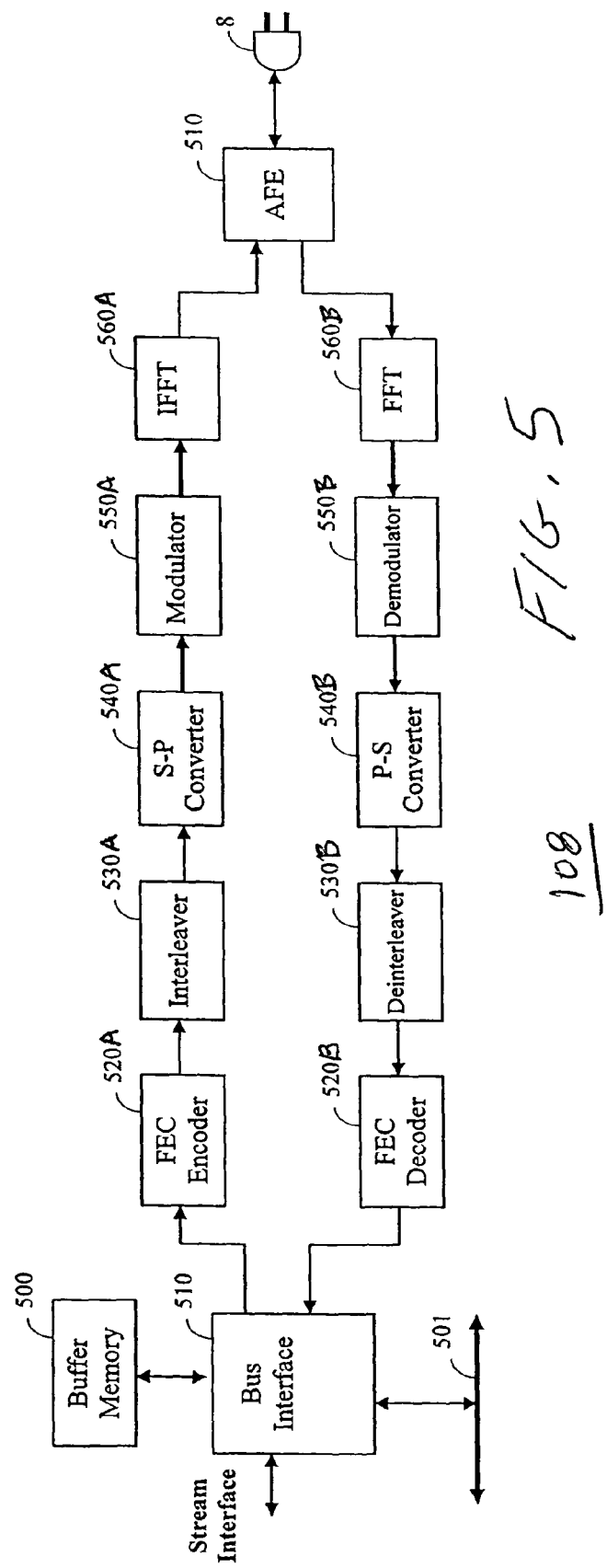
FIG. 5 is a block diagram of a power line communication (PLC) interface consistent with certain embodiments of the present invention.

FIG. 5 is a block diagram illustrating an exemplary PLC interface such as interface 108 (or for example interfaces 204 and 328). The top signal path represents a data transmission path. Data to be transmitted over the power line 1 are received from internal bus 501 by Bus Interface 510 and temporarily stored in Buffer Memory 500. The internal bus 501 is, for example, Bus 300 in Server 2. Error correction code can be added to the data read from Buffer Memory 500 in Forward Error Correction (FEC) Encoder 520A. The output data are interleaved by Interleaver 530A and Serial-Parallel converted by S-P Converter 540A. The parallel signals are modulated by Modulator 550A and sent to Inverse Fast Fourier Transform Block 560A. In IFFT 560A, the input signal is divided among available sub-carriers and inverse fast Fourier transformed. The resulting signal is sent to Analog Front End (AFE) 510 and sent to the power line 1 through the power plug 8.

The lower half blocks of FIG. 5 are used for data reception. The input data are processed in a reversed manner as the processing used for transmission. AFE 510 receives a data stream from the client over the power line 1. The received data are fast-Fourier-transformed by FFT 560B, demodulated by Demodulator 550B and parallel-serial converted by P-S converter 540B. The result is de-interleaved by De-interleaver 530B, error-corrected by FEC decoder 520B and sent to Bus Interface 510. The data are temporarily stored in Buffer Memory 500 and then sent to the internal bus 501. The PLC Interface simultaneously handles transmission and reception of data.

Figure 6:
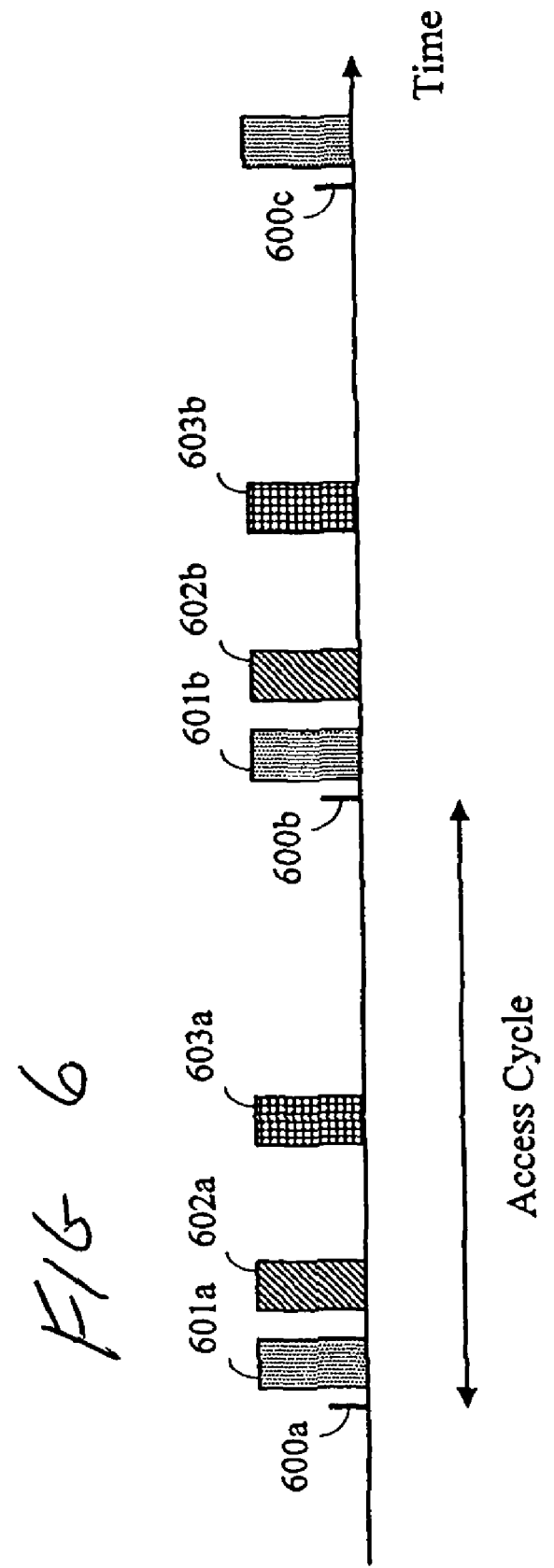
FIG. 6 is a diagram depicting access time slots consistent with certain embodiments of the present invention.

Every access between devices for communication of data between the devices is executed based on an access cycle. A cycle master, for example, Server 2 periodically sends a cycle start timing signal 600 (600a, 600b, 600c, . . . ) as shown in FIG. 6. This signal 600 signifies the start of an access cycle. Each access cycle is divided into hundreds or even thousands of access time slots. To communicate with another device, one or more time slots should be obtained. Once a time slot or set of time slots are obtained, the time slots are reserved during each access cycle until the communication terminates. For example, in FIG. 6, time slot 601 can be a time slot allocated for an audio stream from Server 2 to Audio Client 15. Similarly, time slot 602 can be a time slot designated for an audio stream from Server 2 to Audio Client 16. Time slot 603 can be a time slot allocated for use in sending a video stream from Server 2 to Client TV 1.

As previously noted, there is currently no mechanism for communication using a PLC network for readily sending the same audio stream to multiple devices. For example, sending the same audio program to both Audio Client 15 and Audio Client 16. In order to provide this capability, the present multicast mechanism can be used as follows.

In accordance with current standards, Orthogonal Frequency Division Multiplexing (OFDM) is used for power line networks as well as wireless networks. In an OFDM system, test signals are used to determine which sub-carriers are available for use in communication between any two given points in the network. This information is collected and stored in a "tone map". Available sub-carriers that can be used between any two points depend on the particular characteristics of the transmission path between these two points (e.g., distance, proximity to sources of interference, wire characteristics, number of outlets, path shape, etc.). Thus, for example, all of the sub-carriers which Audio Client 15 can receive from server are not always available at Audio Client 16. Thus, normally both clients may not always receive the same stream without errors if they were required to receive the same data via broadcast using the same sub-carriers. Because of this limitation, broadcast modes have not been made available in standard power line networks except very low-rate robust transmission that is unavailable for use for audio multicast. Thus, in order to deliver the same program material to multiple audio clients, the Server 2, in accordance with certain embodiments consistent with the present invention, sends the same data to each client, potentially using a separate collection of sub-carriers, and using a different time slot.

By way of illustration, assume that Server 2 multicasts an audio stream to Audio Client 15 and 16. Server 2 keeps the same data to multicast in Buffer Memory 500 during the same access cycle and transmits it to each client. In FIG. 6, time slot 601 is designated as a time slot for data destined for Audio Client 15. In a similar manner, time slot 602 is designated for transmission of data destined for Audio Client 16. Server 2 reads the same data twice from Buffer Memory 500 and sends it using time slot 601a and 602a. At the following cycle, Server 2 reads the next data twice for time slot 601b and 602b. In time slot 601 and 602, different combinations of sub-carriers are used based on condition of each transmission path. When transmission condition is not good enough to send all of the data in a single time slot of one access cycle, two or more time slots can be allocated to a particular recipient client audio device. The newly assigned time slot is reserved in subsequent access cycles until the stream terminates.

The following process descriptions describe process that may be carried out in a server such as server 2 of system 50, or any device carrying out functions similar to that of server 2 in a network. In certain embodiments, such processes are stored as a computer programs with instructions stored in memory 301 (or other memory device such as HDD 335) and may be executed on a processor such as computer CPU 302.

Figure 7:
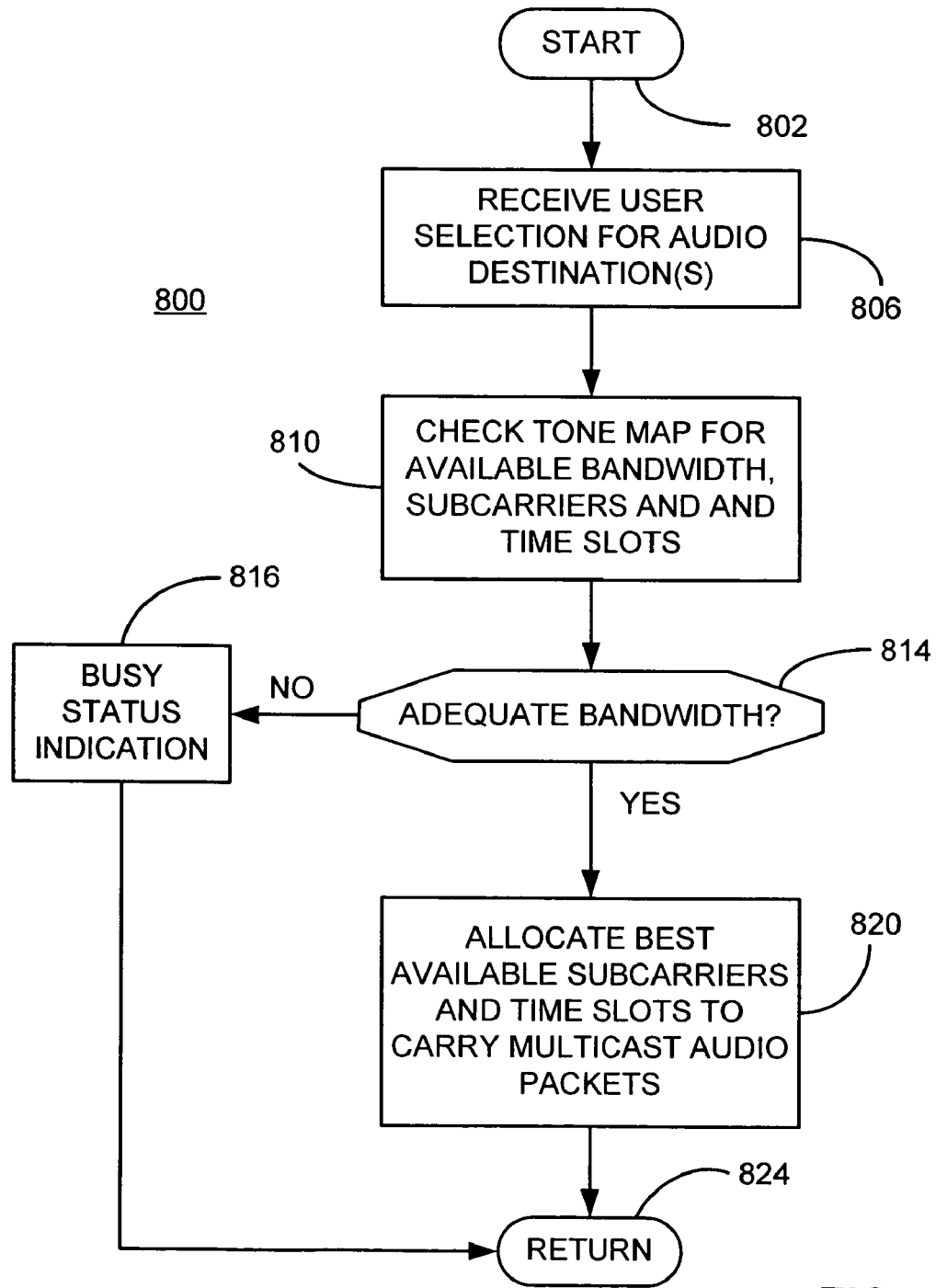
FIG. 7 is a flow chart depicting setup of a multicast communication session consistent with certain embodiments of the present invention.

Referring now to FIG. 7, a process 800 is depicted in flow chart form for setup of a multicast audio communication, whether using the access cycle shown in FIG. 6 or using the access cycle to be described in connection with FIG. 9 later. In this exemplary process, starting at 802, a user selects, using a suitable user interface, to send a single audio program to multiple target (destination) audio clients (e.g., 15 and 16). This selection is received at 806 from the user interface. At 810, the latest tone map is consulted to determine if adequate bandwidth is available on the network to carry out the multicast communication and to determine which sub-carriers and time slots are available for this task. If adequate bandwidth is not available at 814, an appropriate busy status indication mechanism is invoked at 816, for example to notify the user that the requested multicast operation is not possible. However, assuming there is adequate bandwidth, the appropriate time slot and sub-carrier allocation is carried out at 820 for each target recipient audio client at 820. Generally, this involves selection of the best quality sub-carriers available for each target audio client and allocation of enough time slots to carry the audio data. This allocation can change if more time slots are required dynamically or if an updated tone map shows that better sub-carriers are available for use. The process returns at 824. Many variations and enhancements to this process are possible without departing from certain embodiments consistent with the present invention.

Figure 8:
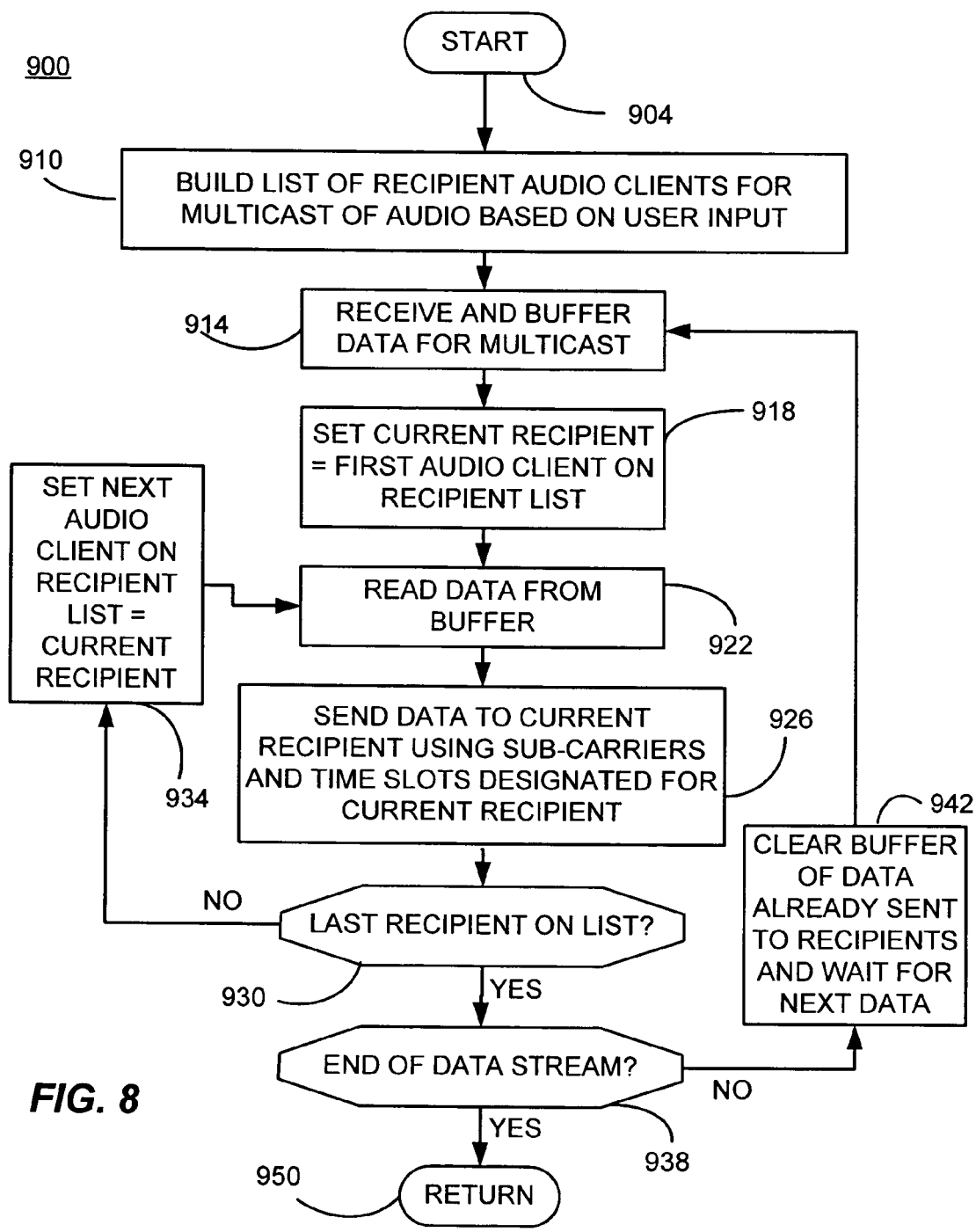
FIG. 8 is a flow chart depicting a process for a multicast communication session consistent with certain embodiments of the present invention.

Once a multicast session is set up as in FIG. 7, a multicast session can be carried out according to the process 900 depicted in the flow chart of FIG. 8, starting at 904. At 910, responsive to the user input of recipients for the multicast session, a list is built of all recipient for the audio program for the multicast session. Generally, the list can be ordered in the order of the time slots allocated to the individual recipient audio client. Data to be multicast is then received and buffered at 914. The current recipient for the multicast for a particular portion of the multicast session is then set to the first audio client on the recipient list. This first audio client on the recipient list is also associated with the first time slot of those assigned to the audio multicast session.

Data are then read from the buffer 500 at 922 and sent at 926 to the current recipient using the sub-carriers and time slots that have been allocated to the first recipient audio client on the list of recipient audio clients. If the last recipient on the recipient list has not been reached at 930, then the current recipient is set equal to the next audio client recipient on the recipient list and control passes to 922 where the same data are read from the buffer 500 again and sent to the current recipient at 926. This process repeats until the last recipient on the recipient list is reached at 930. If the end of the data stream being multicast has not been reached at 938, the buffer is cleared at 942 of all data that has already been sent to all recipients and control passes back to 914 where the next cycle's worth of data are received and buffered. The process then repeats by resetting the current recipient to the first recipient on the list and so on. Once the end of the data stream is reached at 938, the process returns at 950. Many variations on this process are possible including re-ordering of certain functions (e.g., 918 and 914, provided both functions are carried out after 942), without departing from certain embodiments consistent with the present invention.

Thus, a method for multicasting audio data in a power line communication network consistent with certain embodiments involves assigning a set of one or more time slots and one or more sub-carriers for each recipient audio client designated to receive the multicast audio data over a power line serving as a communication medium. A list of recipient audio clients is built for receipt of the multicast audio data over the power line communication network. Audio data are buffered in a buffer, the data being for receipt during a transmission cycle to the recipient audio clients on the list. Data are read from the buffer, and the data are transmitted over the power line communication network to each recipient on the recipient audio client on the list using a time slot and sub-carrier set assigned to each recipient during the transmission cycle.

Certain embodiments consistent with this network system utilize certain optional transmission modes which may be especially suitable for cost-sensitive audio applications. The PLC Interface 328 in Server 2 preferably supports all such optional modes. In the event a particular PLC Interface in an audio client supports only certain modes i.e. a subset of the full modes, then when Server 2 sends a stream to that particular audio client, the Server 2 uses only modes that the particular audio client is able to understand and handle. In certain embodiment, an audio client can be devised to utilize a set of less stringent requirements in order to minimize the cost of the interface and thus the audio client. Consider, for example, the following:

Two or more error correction codes (ECC), for example Reed-Solomon (RS) code and Turbo code can be used in the interface. For a low bit rate transmission such as audio transmission, Server 2 can preferably use RS coding in order to minimize the decoding requirements at the audio client. For a high rate video transmission, Server2 preferably uses Turbo code, which has stronger correction capability. Thus, audio clients may only be required to implement one or the other ECC (or other suitable codes in alternative embodiments), preferably, the easier to implement Reed-Solomon encoding.

Two or more error correction coding parameters may be used. For example, one set of parameters can be used for Reed-Solomon Coding used for a high bit rate transmissions and another used for a low bit rate transmission. RS suitable for use in video applications, in accordance with certain embodiments, uses a 239-byte payload and 16-byte RS error correction code in a 255-byte code. Note that a longer correction code requires more complex and expensive hardware. Thus, Audio Clients 15 and 16, in accordance with the current embodiment, can be designed to only decode RS ECC using 119-byte payload and 8-byte RS code in a 127-byte code. In Viterbi coding, hardware complexity and cost greatly depends on constraint length. Two or more constraint lengths are commonly used. Audio applications generally use only the short length, thus, if Viterbi decoding is made available, the coding can be limited to the shorter code length.

Viterbi decoders are known and described in "Self Correcting Codes Conquer Noise Part One: Viterbi Codecs", by Shah, at al., in EDN magazine online, Feb. 15, 2001, at. The constraint length K in Viterbi coding and decoding, represents the number of k-bit shifts over which a single information bit can influence the encoder output. Simply put, constraint length is the number of bits that the encoder uses to encode n bits. The computational requirements grow exponentially as a function of constraint length, so, in practice, the constraint length is generally limited to 9 bits or less. A greater value of K means more redundancy, which therefore results in better noise immunity. The code rate is fixed, and K can be varied to control the redundancy, and thus, noise immunity.

Two or more interleave lengths may also be used. A long interleave is generally used for video data and a short one for audio data. A long interleave requires a large memory thus increasing the complexity and cost. Audio clients can use short interleave so that short de-interleave can be utilized, thus further reducing cost and complexity. Audio data rate is usually less than 10% of video data rate. Therefore, an interleave length that keeps the same bit or byte interval is also less than 10% of video interleave length (typically approximately 1/20) and in most all cases can be made less than 50% of video interleave length.

A typical bit interval for audio of a 300 Kbps audio stream is 3.3 μsec/bit. If one assumes that the bit interval is held at 1 msec in order to avoid burst errors, then 1 msec/3.3 μsec=300 bits. Thus each bit must be scattered to every 300 bits. If the code length is set at 800 bits, 800×300=240K bits=>approximately 30 K bytes of buffering is required for interleave. If this is contrasted with video at 6 Mbps (20 times faster), to keep a 1 msec span, 6000 bits are required. With an 800-bit code length, 600 K bytes would be required. Thus, an interleave that is approximately 20 times larger than that required for audio is needed for video.

Based on transmission conditions, one of the following modulation schemes can be selected: BPSK (Binary Phase Shift Keying), QPSK (Quadrature Phase Shift Keying) and QAM (Quadrature Amplitude Modulation). QAM is generally best suited for a high bit rate transmission. QAM maps 4 or more bits to each symbol, whereas, BPSK maps only one bit per symbol. QPSK maps 2 bits to each symbol and can be used where higher transmission rates not requiring QAM is needed. Thus the cost of the interface can be lowered if is only enabled for BPSK and QPSK demodulation, or some other modulation scheme that uses less than four bits per symbol.

A low bit rate transmission can also be implemented using only a portion of the whole set of sub-carriers, for example, every other sub-carrier. Also, only a portion of the frequency band may be used. For example, video uses from 4 MHz to 30 MHz, while audio may use from 4 MHz to 20 MHz. By limiting the bandwidth required for audio to 20 MHz, the FFT sampling frequency (fs) and sampling point number (n) can be made lower than that of video (For example, the sampling frequency can be set to approximately 50 MHz in certain embodiments. (cf. 60 MHz or more sampling rate is required to cover up to 30 MHz.). Similarly, the FFT sampling point can be set to 256 points for audio and 1024 points for video). (Note that fs is set at more than twice of the max frequency. FFT frequency resolution (Hz)=fs/n.) This makes the FFT hardware smaller, less expensive and less complex for audio an audio only interface, since it does not have to provide the bandwidth capability necessary for video. The sampling rate for audio can be made low enough, the cost of A/D and D/A conversion can be reduced for audio-only applications. So, by way of example, the sampling rate can be limited to 50 MHz in certain embodiments.

In the United States, amateur (ham) radio frequency bands have been designated for the following ranges 5.33-5.41 MHz, 7.0-7.3 MHz, 10.1-10.15 Mhz, 14.0-14.35 MHz, 18.068-18.168 MHz, 21.0-21.45 MHz, 24.89-24.99 MHz, and 28.0-29.7 MHz. These frequency bands are herein referred to as the ham radio bands. The term ham radio band is also intended to mean any other amateur radio band that falls within the range of bands of the power line communication network. The present PLC network, operates in the range of approximately 4-30 MHz, so these ham radio bands are a potential source of interference with network communication. The current powerline network does not use sub-carriers falling within or adjacent ham radio bands. In case of audio transmission, data rate is low and not so many sub-carriers are required. Therefore, more adjacent sub-carriers are not used. If these sub-carriers are avoided, this eliminates the need for expensive steep filtering (generally situated after the IFFT) to eliminate interference from these bands. This partial OFDM mode significantly reduces the cost of the FFT/IFFT and the analog frontend used in an audio-only (or other low frequency) application.

By way of example, if f0 to f9 are sub-carriers (in frequency order) and f5 falls within one of the ham radio bands, f5 can be avoided for audio applications. In addition, f4 and f6 (sub-carriers "adjacent" to the ham band) could also be disallowed for use in audio transmission. Since use of these sub-carriers might require a steep notch filter to reduce side-robe signals from the adjacent sub-carriers: f4 and f6, if sub-carriers f4, f5 and f6 are not used, there is no need to include a filter to eliminate these side-lobe signals. Thus, in certain embodiments of an audio-only mode, f4 and f6 are not used in addition to f5 and a less steep notch filter, or perhaps no notch filter at all, is required. The particular characteristics required depends upon the sub-carrier span, output signal level, sampling rate, etc.

Since no large buffer is required for audio applications, a small buffer memory can be used for audio only interfaces. A typical compressed audio stream rate is 300 Kbits/second. If the buffer is set to hold two seconds of audio, then 600K bits or approximately 75 K bytes, or less than 100 K bytes, and far less than 1M bit (125 kbytes) of memory would be adequate. This should be contrasted with providing two seconds of video data. For a typical MPEG-SD video at a 6 Mbit/second rate, two seconds of video would consume 12M bits, or about 1.5 M bytes of memory—a factor of about 20 greater than that needed for audio only. Thus, for audio only applications, the buffer size can be reduced by approximately a factor of 20, and certainly less than 50%.

Thus, a low cost audio client interface can be devised for a power line communication network for connecting to a power line communication network serving as a communication medium using time slotted Orthogonal Frequency Division Multiplexing (OFDM). The interface is adapted to receive an assignment of a set of one or more time slots and one or more sub-carriers to receive the multicast audio data over the a power line. An Inverse Fast Fourier Transformer (IFFT) operates at a sampling rate, and receives data from the power line communication network using the assigned time slots and sub-carriers. A demodulator receives an output from the IFFT, that demodulates using either Bipolar Phase Shift Keying (BPSK) modulation or Quadrature Phase Shift Keying (QPSK) and wherein the demodulator is unable to demodulate Quadrature Amplitude Modulation (QAM). A de-interleaver de-interleaves the demodulated output, and the interleave does not exceed that does not use more than about 50 K bytes of buffering. A forward error correction decoder uses a Reed Solomon error correction code. More sub-carriers are excluded than the number that would be used for full bandwidth video transmission in order to avoid need for the steep filtering used to minimize interference from ham radio bands. The IFFT can operate on data that are sampled at a low sampling rate. The total buffer memory needed for such an interface is approximately 1/20 as much as might be required for video.

Figure 9:
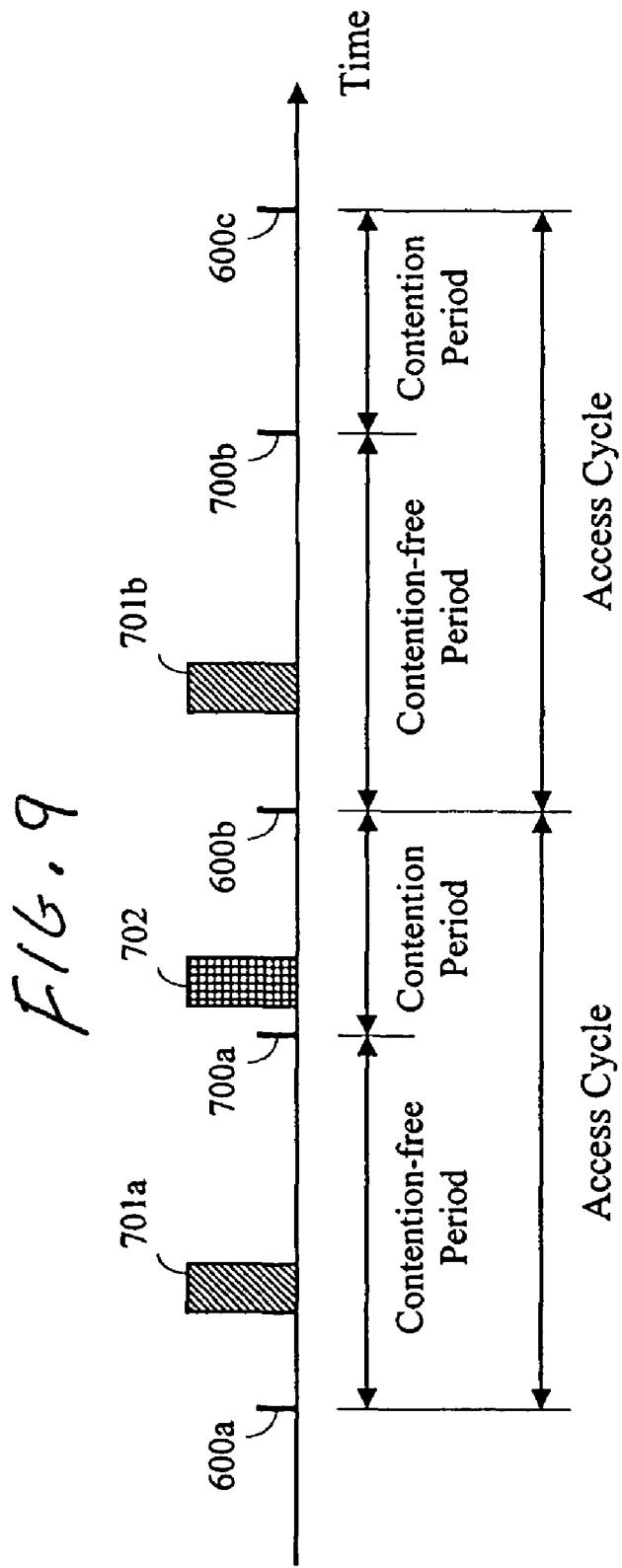
FIG. 9 is a diagram depicting an alternative time slot arrangement consistent with certain embodiments of the present invention.

In another embodiment consistent with the present invention, one access cycle can be divided into at least two periods: a contention-free period and a contention period, as depicted in FIG. 9. In this embodiment, one device, for example, Server 2 periodically sends a cycle start timing signal 600 (600a, 600b, 600c, . . . ) as before and as shown in FIG. 9. In addition, a contention period is defined within the overall cycle (between cycle start timing signals). This contention period, as shown is located at the end of the access cycle, but could be located elsewhere without departing from the invention. In this embodiment, a start contention period timing signal 700 (700a, 700b, 700c, . . . ) is used to establish a start of the contention period and define the end of the contention free period. In this embodiment, the contention period expires at the end of the access cycle. The contention period is used for CSMA (Carrier Sense Multiple Access). QoS (Quality of Service) is not guaranteed in CSMA. Even if the transmitter gets time slot 702, there is no guarantee that the transmitter gets a time slot in the following access cycle.

HomePlug 1.0 (current PLC technology) uses CSMA. Thus, when the powerline network is lightly loaded or not busy, audio streaming is generally successful. However, during periods of heavy loading of the transmission media, for example during a large file transfer, audio transmission might be disrupted. To avoid this problem, audio transmission can be carried out using the contention-free period, which reserves a time slot for every access cycle.

In this embodiment, it should be noted that the same packet format is used for both contention-free and contention period, so an inexpensive client (ex. HomePlug 1.0) that is designed for only CSMA can receive both a contention-free packet and contention packet. In other words, the client need not even be aware that there is a contention free period for audio receive only application. The client receives incoming packets regardless of their position within contention or contention-free periods. When the client sends a command or status data, contention periods are used. The client is generally prohibited, however, from use of the contention-free periods for transmission. By use of certain embodiments consistent with this teaching, an inexpensive CSMA client can receive a QoS guaranteed stream for no additional cost premium.

The use of the access cycle is controlled by a network element designated as the cycle master. The cycle master sends a signal with indicates the end of the contention free period. Alternatively, the last transmitter who uses the contention free period in an access cycle may send as signal indicating it is completed. After an audio client receives this signal, the audio client starts contention access (using CDMA). This transmission should be completed before the next contention free period is signaled. The audio client can receive data in either the contention period or the contention free period without need for a detection mechanism to determine whether or not the period is contention free or not.

This mechanism can be used not only for audio streaming but also for data that requires a fast transfer. When the server needs to send a file or other data as soon as possible, contention-free access is chosen. Even if the client has an inexpensive CSMA interface, the client can receive it.

Certain embodiments consistent with this invention can be applied not only to power line network, but also to wireless, phone line, cable or other networks.

This network system, in certain embodiments, has the following advantages:
(1) The PLC interface in the server repeatedly sends the same data to each client in an access cycle. Each client can receive the data under optimal condition.
(2) A low bit rate application (e.g., less than four bits per symbol) can use a subset of the full format. This makes the client hardware simpler and reduces the cost.
(3) The client does not have to have complicated contention free access capability to receive data sent from the server using contention free access.

However, it should be noted that failure of any particular embodiment or implementation to achieve these advantages should not be construed to exempt the claims from reading on such embodiment.

Those skilled in the art will recognize that the certain embodiments have been described based upon use of a programmed processor. However, other embodiments could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments.

Those skilled in the art will appreciate that the program steps and associated data used to implement the embodiments described above can be implemented using disc storage as well as other forms of computer readable storage devices such as for example Read Only Memory (ROM) devices, Random Access Memory (RAM) devices; optical storage elements, magnetic storage elements, magneto-optical storage elements, flash memory, core memory and/or other equivalent storage technologies. Such alternative storage devices should be considered equivalents.

Certain embodiments described herein are implemented using a programmed processor executing programming instructions that are broadly described above in flow chart form that can be stored on any suitable computer readable storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While specific embodiments have been described, it is evident that many alternatives, modifications, permutations and variations will become apparent to those skilled in the art in light of the foregoing description.

What is claimed is:

1. A method for multicasting audio data in a power line communication network, comprising:
   assigning a set of one or more time slots and one or more sub-carriers for each recipient audio client designated to receive the multicast audio data over a power line serving as a communication medium for a multicast session;
   wherein transmissions of the multicast audio data are carried out over the power line communication network during a repetitive time cycle that forms a transmission cycle, wherein each transmission cycle has a contention free time period and a contention period, wherein carrier sense multiple access (CSMA) is used to determine usage of the network during the contention period, and wherein the duration of the contention free time period within the transmission cycle is defined by a cycle master device residing on the power line communication network and the cycle master device communicates a start of the contention free time period of the defined transmission cycle via a cycle start timing signal propagated on the power line and communicates a start of the contention period of the defined transmission cycle via a start contention period timing signal propagated on the power line;
   building a list of recipient audio clients for receipt of the multicast audio data over the power line communication network responsive to a user input of recipients for the multicast session;
   generating the cycle start timing signal;
   buffering audio data in a buffer, the audio data being for receipt during the contention free time period of the transmission cycle to the recipient audio clients on the list;
   reading the audio data from the buffer;
   transmitting the audio data over the power line communication network to each recipient on the recipient audio client list using a time slot and sub-carrier set assigned to each recipient during the contention free time period within the transmission cycle to effect a multicast of the audio data; and
   generating the start contention period timing signal.

2. The method according to claim 1, further comprising repeating the buffering, reading and transmitting for each of a plurality of transmission cycles.

3. The method according to claim 1, wherein the cycle master defines the duration of the contention free time period of the transmission cycle by transmission of the cycle start timing signal over the network to indicate that the contention free time period has ended during each cycle, so that the contention free time period can be varied according to bandwidth requirements for contention free communications.

4. The method according to claim 1, wherein the assigned sub-carriers exclude sub-carriers that overlap the frequency range of ham radio bands.

5. The method according to claim 1, wherein the certain sub-carriers are excluded from the full set of sub-carriers that would be available for video.

6. The method according to claim 1, wherein the data are transmitted using a modulation scheme that maps less than four bits per symbol.

7. The method according to claim 1, wherein the data are transmitted using Reed Solomon encoding.

8. The method according to claim 1, wherein the data are transmitted using an interleave that is less than 50 percent of that used for transmitting video data over the PLC network.

9. The method according to claim 1, wherein the data are transmitted using Orthogonal Frequency Division Multiplexing (OFDM), and wherein the OFDM uses an Inverse Fast Fourier Transform (IFFT) operating on data that is sampled at a sampling rate that is not greater than 50 MHz.

10. A tangible non-transitory computer readable storage medium storing instructions which, when executed on a programmed processor, carry out a process of multicasting audio data in a power line communication network, comprising:
assigning a set of one or more time slots and one or more sub-carriers for each recipient audio client designated to receive the multicast audio data over the power line communication network;
wherein transmissions of the multicast audio data are carried out over the power line communication network during a repetitive time cycle that forms a transmission cycle, wherein each transmission cycle has a contention free time period and a contention period, wherein carrier sense multiple access (CSMA) is used to determine usage of the network during the contention period, and wherein the duration of the contention free time period within the transmission cycle is defined by a cycle master device residing on the power line communication network and the cycle master device communicates a start of the contention free time period of the defined transmission cycle via a cycle start timing signal propagated on the power line and communicates a start of the contention period of the defined transmission cycle via a start contention period timing signal propagated on the power line;
building a list of recipient audio clients for receipt of the multicast audio data over the power line communication network;
buffering audio data in a buffer, the audio data being for receipt during the contention free time period of the transmission cycle to the recipient audio clients on the list;
reading audio data from the buffer, and
transmitting the audio data over the power line communication network to each recipient on the recipient audio client on the list using a time slot and sub-carrier set assigned to each recipient during contention free time period within the transmission cycle to effect a multicast of the audio data.

11. The tangible non-transitory computer readable storage medium according to claim 10, wherein the process further comprises repeating the buffering, reading and transmitting for each of a plurality of transmission cycles.

12. The tangible non-transitory computer readable storage medium according to claim 10, wherein the cycle master defines the duration of the contention free time period of the transmission cycle by transmission of the cycle start timing signal over the network to indicate that the contention time free period has ended during each cycle, so that the contention free time period can be varied according to bandwidth requirements for contention free communications.

13. A method of allocating time slots in a power line communication (PLC) network, comprising:
establishing a repetitive access cycle for use by connected devices connected to the power line communication network to access the communication medium;
establishing a contention period forming a part of each repetitive access cycle during which time carrier sense multiple access (CSMA) is used to determine usage of the power line communication network; and
establishing a contention free period forming a part of each repetitive access cycle, during which time, contention for use of the communication medium by connected devices is not permitted wherein the contention free period is reserved for multicast of audio data;
wherein the duration of the contention free period within each repetitive access cycle is defined by a cycle master device residing on the power line communication network and the cycle master device communicates a start of the contention free period of the defined repetitive access cycle via a cycle start timing signal propagated on the power line and communicates a start of the contention period of the defined repetitive access cycle via a start contention period timing signal propagated on the power line.

14. The method according to claim 13, wherein a starting point for each of the access cycles is identified by an access cycle start signal, and wherein the starting point for the access cycle is also a starting point for each contention free period of the access cycle.

15. The method according to claim 13, wherein the contention free period ends with a signal from the cycle master that signifies the end of the contention free period.

16. The method according to claim 13, wherein the contention free period is reserved for use in transmissions from a server device to a client device.

17. The method according to claim 13, wherein the server device comprises an audio server device and wherein the client device comprises an audio client device.

18. The method according to claim 13, wherein data is communicated over the communication medium is carried out using a packet format that is the same without regard for whether it is communicated during the contention free period or not.

19. A server that provides multicast audio data in a power line communication (PLC) network, comprising:
a power line communication interface that couples data to and from a power line network serving as a communication medium using a time slotted Orthogonal Frequency Division Multiplexing (OFDM) transmitter and receiver;
wherein transmissions of multicast audio data are carried out over the power line communication network during a repetitive time cycle that forms a transmission cycle, wherein each transmission cycle has a contention free time period and a contention period, wherein carrier sense multiple access (CSMA) is used to determine usage of the network during the contention period, and wherein the duration of the contention free time period within the transmission cycle is defined by a cycle master device residing on the power line communication network and the cycle master device communicates a start of the contention free time period of the defined transmission cycle via a cycle start timing signal propagated on the power line and communicates a start of the contention period of the defined transmission cycle via a start contention period timing signal propagated on the power line;

a source of audio content;

means for assigning a set of one or more time slots and one or more sub-carriers for each recipient audio client designated to receive the multicast audio data over the power line;

means for building a list of recipient audio clients for receipt of the multicast audio data over the power line communication network;

a buffer memory that buffers audio data from the source of the audio content, the audio data being for receipt during the contention free time period of the transmission cycle to the recipient audio clients on the list;

means for reading audio data from the buffer; and the OFDM transmitter transmitting the audio data over the power line communication network to each recipient on the recipient audio client list using a time slot and sub-carrier set assigned to each recipient during the contention free time period of the transmission cycle to effect a multicast of the audio data.

20. The server according to claim 19, wherein the buffering, reading and transmitting is carried out for each of a plurality of transmission cycles.

21. The server according to claim 19, wherein the cycle master defines the duration of the contention free time period of the transmission cycle by transmission of the cycle start timing signal over the network to indicate that the contention free time period has ended during each cycle, so that the contention free time period can be varied according to bandwidth requirements for contention free communications.

22. The server according to claim 19, wherein the assigned sub-carriers exclude sub-carriers that overlap the frequency range of ham radio bands.

23. The server according to claim 19, wherein the certain sub-carriers are excluded from the full set of sub-carriers that would be available for video.

24. The server according to claim 19, wherein the data are transmitted using a modulation scheme that maps less than four bits per symbol.

25. The server according to claim 19, wherein the data are transmitted using Reed Solomon forward error correction coding.

26. The server according to claim 19, wherein the data are transmitted using an interleave that is less than 50 percent of that used for transmitting video data over the PLC network.

27. The server according to claim 19, wherein the data are transmitted using Orthogonal Frequency Division Multiplexing (OFDM), and wherein the OFDM uses an Inverse Fast Fourier Transform (IFFT) operating on data that is sampled at a sampling rate that is not greater than 50 MHz.

28. An audio client interface to a power line communication (PLC) network, comprising:

means for connecting to a power line communication network serving as a communication medium using time slotted Orthogonal Frequency Division Multiplexing (OFDM);

transmissions of multicast audio data to the audio client being carried out over the power line communication network during a repetitive time cycle that forms a transmission cycle, wherein each transmission cycle has a contention free time period and a contention period, wherein carrier sense multiple access (CSMA) is used to determine usage of the network during the contention period, and wherein the duration of the contention free time period within the transmission cycle is defined by a cycle master device residing on the power line communication network and the cycle master device communicates a start of the contention free time period of the defined transmission cycle via a cycle start timing signal propagated on the power line and communicates a start of the contention period of the defined transmission cycle via a start contention period timing signal propagated on the power line, and audio data is transmitted over the power line communication network to each recipient during the contention free period within the transmission cycle to effect a multicast of the audio data;

means for receiving an assignment of a set of one or more time slots and one or more sub-carriers to receive the multicast audio data over the power line;

an Inverse Fast Fourier Transformer (IFFT) operating at a sampling rate, and receiving data from the power line communication network using the assigned time slots and sub-carriers;

a demodulator, receiving an output from the IFFT, wherein the demodulator maps no more than four bits per symbol;

a de-interleaver that de-interleaves the demodulated output, and wherein the interleave is less than 50 percent of that used for transmitting video data over the PLC network; and a forward error correction decoder that uses a Reed Solomon error correction code, and wherein the forward error correction decoder is unable to decode Viterbi encoded data.

29. The interface according to claim 28, wherein the cycle master defines the duration of the contention free time period of the transmission cycle by transmission of the cycle start timing signal over the network to indicate that the contention free time period has ended during each cycle, so that the contention free time period can be varied according to bandwidth requirements for contention free communications.

30. The interface, according to claim 28, wherein the assigned sub-carriers exclude sub-carriers that overlap the frequency range of ham radio bands.

31. The interface according to claim 29, wherein the certain sub-carriers are excluded from the full set of sub-carriers that would be available for video.

32. The interface according to claim 28, wherein the IFFT operates on data that are sampled at a sampling rate does not exceed 50 MHz.

33. The interface according to claim 28, further comprising a buffer memory that is less than 50 percent of the size of that used for buffering video data on the PLC network for buffering incoming data.

34. A method for multicasting audio data in a power line communication network, comprising:

assigning a set of one or more time slots and one or more sub-carriers for each individual recipient audio client designated to receive the multicast audio data over a power line serving as a communication medium; and individually transmitting a stream of multicast audio data repeatedly over the power line communication network to each recipient on a recipient audio client list using a time slot and sub-carrier set assigned to each recipient during a transmission cycle, transmissions to the audio client being carried out over the power line communication network during a repetitive time cycle that forms the transmission cycle, wherein each transmission cycle has a contention free time period and a contention period, wherein carrier sense multiple access (CSMA) is used to determine usage of the network during the contention period, and wherein the duration of the contention free time period within the transmission cycle is defined by a cycle master device residing on the power line communication network and the cycle master device communicates a start of the contention free time period of the defined transmission cycle via a cycle start timing signal propagated on the power line and communicates a start of the contention period of the defined transmission cycle via a start contention period timing signal propagated on the power line, and audio data is transmitted over the power line communication network to each recipient during the contention free time period within the transmission cycle to effect a multicast of the audio data.

35. The method according to claim 34, further comprising building a list of recipient audio clients for receipt of the multicast audio data over the power line communication network; and buffering the stream of data in a buffer, the data being for receipt during a transmission cycle to the recipient audio clients on the list.

36. The method according to claim 34, further comprising repeatedly reading the data from the buffer prior to individually transmitting the data to each recipient audio client.

37. The method according to claim 34, wherein the assigning further comprises selecting a sub-carrier deemed to provide most reliable communication to each individual recipient audio client.

38. The method according to claim 34, wherein the assigning further comprises selecting a modulation method deemed to provide most reliable communication to each individual audio recipient.

39. The method according to claim 38, wherein the selected modulation method comprises a modulation method that maps no more than four bits per symbol.

40. The method according to claim 38, wherein the selected modulation method comprises one of BPSK and QPSK and excludes QAM.

41. The method according to claim 38, wherein the selected modulation method is selected from a plurality of power line communication modulation methods, and wherein the selected modulation method comprises a selected modulation method that is less expensive to demodulate than others of the plurality of power line communication modulation methods.

42. A method for multicasting audio data in a power line communication network, comprising:

assigning an audio mode for each individual recipient audio client designated to receive the multicast audio data over the power line serving as a communication medium; and individually transmitting a stream of multicast audio data repeatedly over the power line communication network to each recipient on a recipient audio client list using a time slot and sub-carrier set assigned to each recipient during a transmission cycle, transmissions to each recipient audio client being carried out over the power line communication network during a repetitive time cycle that forms the transmission cycle, wherein each transmission cycle has a contention free time period and a contention period, wherein carrier sense multiple access (CSMA) is used to determine usage of the network during the contention period, and wherein the duration of the contention free time period within the transmission cycle is defined by a cycle master device residing on the power line communication network and the cycle master device communicates a start of the contention free time period of the defined transmission cycle via a cycle start timing signal propagated on the power line and communicates a start of the contention period of the defined transmission cycle via a start contention period timing signal propagated on the power line, and wherein transmissions of audio data to each recipient audio client is carried out during the contention free time period to effect a multicast of the audio data.

43. The method according to claim 42, wherein the audio mode comprises a mode selected to use a simpler error correction code than error correction codes that would be used for transmission of video data in the power line communication network.

44. The method according to claim 42, wherein the audio mode comprises a mode selected to use a shorter error correction code than error correction codes that would be used for transmission of video data in the power line communication network.

45. The method according to claim 42, wherein the audio mode comprises a mode selected to use a shorter interleave length than interleave lengths that would be used for transmission of video data in the power line communication network.

46. The method according to claim 42, wherein the audio mode comprises a mode selected to use a smaller set of sub-carriers than a set of sub-carriers available for transmission of video data in the power line communication network.

47. The method according to claim 42, wherein the audio mode comprises a mode selected to use a narrower frequency band than the available frequency band for transmission of video data in the power line communication network.

48. The method according to claim 42, wherein the audio mode comprises a mode selected to use available sub-carriers that do not overlap ham radio bands.

49. The method according to claim 42, wherein the audio mode comprises a mode selected to use available sub-carriers that are not adjacent to ham radio bands.

50. The method according to claim 42, wherein the audio mode requires a shorter buffer memory than that which would be required for transmission of video data in the power line communication network.

51. An audio client for use in a power line communication network, comprising:

means for connecting to a power line communication network serving as a communication medium using time slotted Orthogonal Frequency Division Multiplexing (OFDM);

wherein transmissions of multicast audio data to the audio client are carried out over the power line communication network during a repetitive time cycle that forms a transmission cycle, wherein each cycle has a contention free time period and a contention period, wherein carrier sense multiple access (CSMA) is used to determine usage of the network during the contention period, and wherein the duration of the contention free time period within the transmission cycle is defined by a cycle master device residing on the power line communication network and the cycle master device communicates a start of the contention free time period of the defined transmission cycle via a cycle start timing signal propagated on the power line and communicates a start of the contention period of the defined transmission cycle via a start contention period timing signal propagated on the power line, and audio data is transmitted over the power line communication network to each recipient during the contention free time period within the transmission cycle to effect a multicast of the audio data;

means for receiving an assignment of an audio mode, a set of one or more time slots and one or more sub-carriers to receive the multicast audio data over the power line;

an Inverse Fast Fourier Transformer (IFFT) operating at a sampling rate, and receiving the audio data from the power line communication network using the assigned time slots and sub-carriers;

a demodulator, receiving an output from the IFFT, that demodulates using a demodulation method that is selected from a plurality of power line communication demodulation methods, and wherein the selected demodulation method comprises a method that is less expensive than others of the plurality of power line communication demodulation methods;

a de-interleaver that de-interleaves the demodulated output, and wherein the interleaver uses an interleave that is less than that which would be used for demodulation of video data in the power line communication system; and a forward error correction decoder that decodes an error correction code that is shorter than an error correction code that would be used for decoding video data in the power line communication system.

52. The audio client according to claim 51, wherein the audio mode comprises a mode selected to use a simpler error correction code than error correction codes that would be used for transmission of video data in the power line communication network.

53. The audio client according to claim 51, wherein the assigned sub-carriers are selected to provide most reliable communication to each individual recipient audio client.

54. The audio client according to claim 51, wherein the data received from the power line communication network is modulated according to a modulation method deemed to provide most reliable communication to each individual audio recipient.

55. The audio client according to claim 51, wherein data from the power line communication network is modulated using a modulator that maps less than four bits per symbol.

56. The audio client according to claim 51, wherein the audio mode comprises a mode selected to use a smaller set of sub-carriers than a set of sub-carriers available for transmission of video data in the power line communication network.

57. The audio client according to claim 51, wherein the audio mode comprises a mode selected to use a narrower frequency band than a frequency band that would be available for transmission of video data in the power line communication network.

58. The audio client according to claim 51, wherein the audio mode comprises a mode selected to use available sub-carriers that do not overlap ham radio bands.

59. The audio client according to claim 51, wherein the audio mode comprises a mode selected to use available sub-carriers that are not adjacent to ham radio bands.

60. The audio client according to claim 51, further comprising a buffer memory that is shorter than that which would be required for video data.

61. The audio client according to claim 51, wherein data is transmitted over the power line communication network during either a contention period or a contention free period, and wherein the audio client receives audio data without regard for which of the contention period or contention free period is used to transmit the audio data.

62. The audio client according to claim 61, wherein the audio client is devoid of any circuitry that distinguishes between the contention period and the contention free period.

63. The audio client according to claim 61, wherein a single packet format is used for communication using either the contention period or the contention free period.

64. The method according to claim 1, where assigning the set of the one or more time slots and the one or more sub-carriers for each recipient audio client designated to receive the multicast audio data over the power line serving as the communication medium for the multicast session comprises:

dynamically updating a tone map of available sub-carriers for each recipient audio client;

selecting best quality sub-carriers from the available sub-carriers for each recipient audio client; and allocating enough time slots for each recipient audio client to carry the multicast audio data.

65. The method according to claim 64, where dynamically updating the tone map of available sub-carriers for each recipient audio client comprises:

sending test signals to each recipient audio client; and determining which sub-carriers are available for use in communication to each recipient audio client.

66. A method for multicasting audio data in a power line communication network, comprising:

sending test signals to each recipient audio client;

determining which sub-carriers are available for use in communication to each recipient audio client;

selecting best quality sub-carriers from the available sub-carriers for each recipient audio client, wherein certain sub-carriers are excluded from a full set of sub-carriers that would be available for video;

allocating enough time slots for each recipient audio client to carry the multicast audio data;

assigning a set of one or more time slots and one or more sub-carriers for each recipient audio client designated to receive the multicast audio data over a power line serving as a communication medium for a multicast session based upon the selected best quality sub-carriers and the allocated time slots for each recipient audio client, wherein the assigned one or more sub-carriers exclude sub-carriers that overlap a frequency range of ham radio bands;

wherein transmissions of the multicast audio data are carried out over the power line communication network during a repetitive time cycle that forms a transmission cycle, wherein each transmission cycle has a contention free time period and a contention period, wherein carrier sense multiple access (CSMA) is used to determine usage of the network during the contention period, and wherein the duration of the contention free time period within the transmission cycle is defined by a cycle master device residing on the power line communication network and the cycle master device communicates a start of the contention free time period of the defined transmission cycle via a cycle start timing signal propagated on the power line and communicates a start of the contention period of the defined transmission cycle via a start contention period timing signal propagated on the power line;

building a list of recipient audio clients for receipt of the multicast audio data over the power line communication network responsive to a user input of recipients for the multicast session;

generating the cycle start timing signal;

buffering audio data in a buffer, the audio data being for receipt during the contention free time period of the transmission cycle to the recipient audio clients on the list;

reading the audio data from the buffer;

transmitting the audio data over the power line communication network to each recipient on the recipient audio client list using a time slot and sub-carrier set assigned to each recipient during the contention free time period within the transmission cycle to effect a multicast of the audio data;

generating the start contention period timing signal; and repeating the generating the cycle start timing signal, buffering, reading and transmitting, and generating the start contention period timing signal for each of a plurality of transmission cycles.

* * * * *